United States Patent

Swengel, Sr.

[15] 3,703,623

[45] Nov. 21, 1972

[54] PRE-INSULATED AND UNINSULATED WIRE TERMINAL BONDING PROCESS AND APPARATUS

[72] Inventor: Robert Charles Swengel, Sr., York, Pa.

[73] Assignee: AMP Incorporated, Harrisburg, Pa.

[22] Filed: Dec. 3, 1970

[21] Appl. No.: 94,722

Related U.S. Application Data

[63] Continuation-in-part of Ser. No. 774,268, Nov. 8, 1968, abandoned.

[52] U.S. Cl. .........................219/137, 219/78, 219/92
[51] Int. Cl. ...............................................B23k 9/00
[58] Field of Search...........219/78, 92, 117, 129, 137, 219/85; 29/628, 693; 339/275 A, 275 ST, 276 R

[56] References Cited

UNITED STATES PATENTS

| | | | |
|---|---|---|---|
| 3,409,977 | 11/1968 | Johnson | 29/494 |
| 3,131,288 | 4/1964 | Browning | 219/121 |
| 2,431,368 | 11/1947 | Cherry et al. | 219/129 X |
| 3,474,521 | 10/1969 | Schwenn | 29/493 |
| 2,504,753 | 4/1950 | Suydam, Jr. | 219/78 |
| 1,744,797 | 1/1930 | Pfeiffer | 219/92 X |

Primary Examiner—J. V. Truhe
Assistant Examiner—George A. Montanye
Attorney—William J. Keating, Ronald D. Grefe, Gerald K. Kita, Frederick W. Raring, Jay L. Seitchik and John P. Vandenburg

[57] ABSTRACT

The disclosure relates to a bonding process and apparatus whereby two metals are brought together under pressure from a pair of dies or a die and anvil, the interface between the metals being made to achieve an intimate bond by an elevation in temperature provided by heat energy conducted via a portion of one or both metals protruding from the forceful contact area, heat being applied slightly before or simultaneously with the application of pressure, and more particularly, the peak pressure of the crimping characteristic curve, and from a source other than the dies.

10 Claims, 4 Drawing Figures

PATENTED NOV 21 1972

Inventor
ROBERT C. SWENGEL SR.

By: John P. Vandenburg

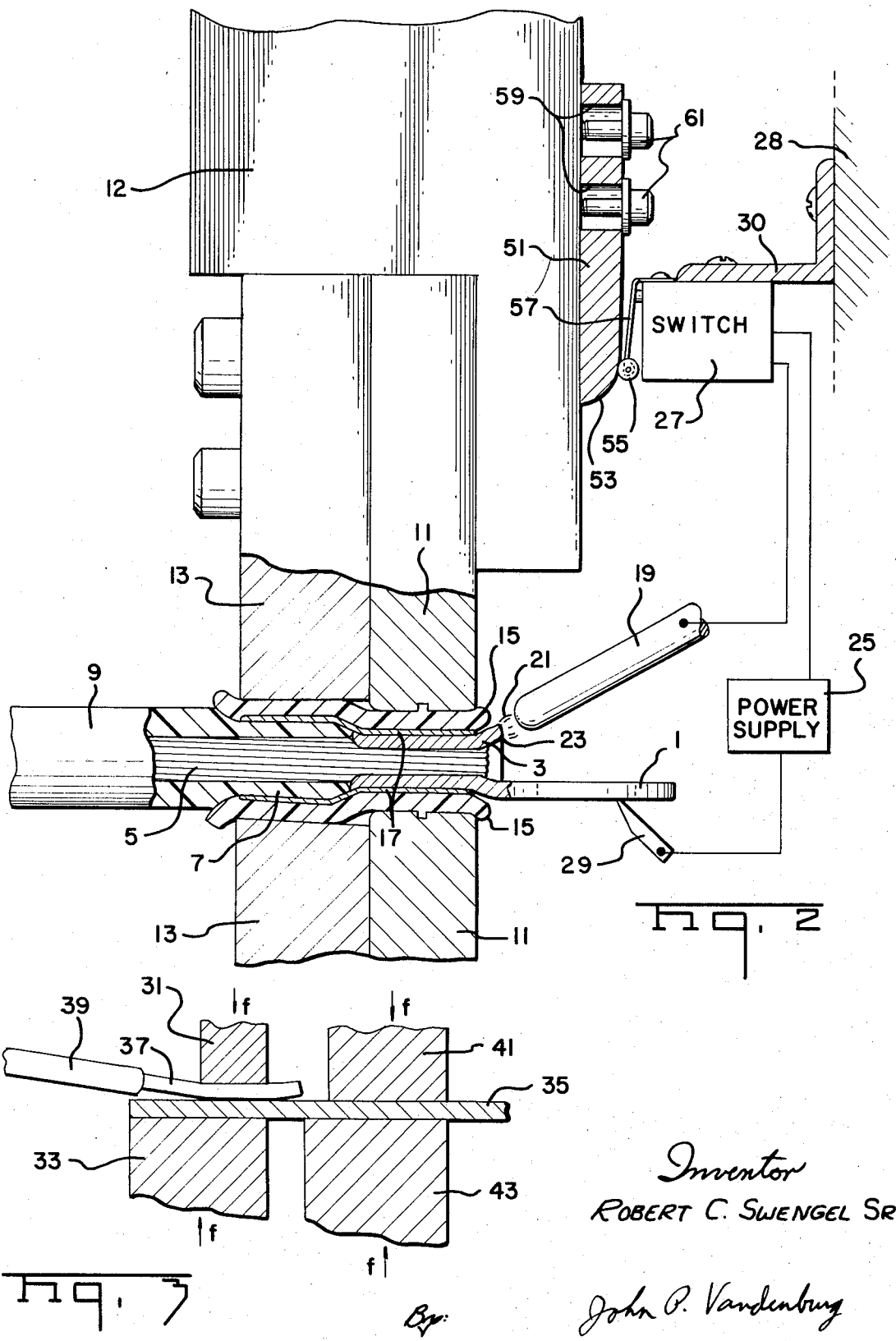

PRE-INSULATED AND UNINSULATED WIRE TERMINAL BONDING PROCESS AND APPARATUS

The present application is a continuation-in-part of my prior application, Ser. No. 774,268, filed Nov. 8, 1968 now abandoned, and to which priority is asserted as to common subject matter.

This invention relates to a method of obtaining an improved joining of two metals and more specifically to the joining of two metals by exerting a force across the interface, such as can be obtained by crimping dies or the like, and the heating slightly before or simultaneously therewith of one or the other or both of the metals from a source external to the force die members. As stated previously, the heat is to be applied slightly before or simultaneously with the application of pressure, and more specifically, the peak pressure of the crimping characteristic curve, as will be discussed in more detail hereinafter.

Thermo compression joining processes are well known in the art of metal joining and extensively covered in the literature. An old and well known process of this nature is the familiar forging as carried out by the blacksmith. This process utilizes the heating of the two metals to their plastic but not molten region in a forge prior to their being joined by the force of the hammer blows. Present-day thermo compression bonding processes employ this same concept with the exception that the heat is supplied by conductance from one or the other of the dies being used to press the metals into intimate contact or by using the dies as electrical current contact members. In this last case, the passage of a current of sufficient intensity through the circuit comprising the dies and the workpieces can raise the temperature of the work pieces to a point where metal joining can occur.

Ordinarily, the use of an electrical current through the workpieces would fall under the classification of resistance welding or joining in which either a thermo compression or a true fusion bond can be established by varying the current and thus the rate of heating of the work pieces.

Parallel gap welding also can be used to obtain either a thermo compression or fusion type of metal to metal bond although in this case the electrical current is supplied by two electrically isolated dies in contact with only one of the workpieces, the opposing force member being used to supply only the mechanical forces necessary to obtain intimate joining at the elevated temperature.

In some instances the reflow and fusion of tin or solder previously applied to one or both workpieces, can be accomplished by the application of force and heat as just described and effect a metal to metal bond of very substantial nature.

While these methods of metal joining find usefulness in the art and science of metal joining there are instances where they cannot be usefully employed and other instances where the use of a new method employing a source of heating external to the die members exerting the necessary mechanical forces is advantageous and necessary.

A situation wherein the prior art methods cannot be employed is represented by a construction wherein the metals to be joined are contained within a semi-enclosure of a plastic or heat insulating material whose integrity must be maintained during and after the joining operation. One such device already exists in the form of a preinsulated terminal where the mechanical forces necessary to compress the wire conductor and the terminal barrel into intimate contact are applied through the plastic shield to the metals within. If the prior art hot die method were employed in an attempt to achieve a thermo compression or solder bond of the metals in this construction, melting and charring of the insulation would result with the loss of insulating integrity as a result. The method of heating using an electrical current passing from one die to the other cannot be employed because the insulation is a barrier to the passage of an electrical current.

Another situation wherein the direct heating by a hot die or dies, or the passage of an electrical current from one die through the workpieces to the other die can be used as a means of generating heat for the bonding process, is represented by an open or closed uninsulated barrel wire terminal. If, however, as is generally the case, the dies are required to exert a considerable force in crimping the barrels onto the wire conductor, the material from which the dies are constructed must be chosen for high strength and a long wear life. Should it be necessary therefor to use temperatures approaching or even exceeding 1,000° F., which are usually required for thermo bonding, the wear life of the dies would be considerably reduced. It would, for example, be virtually impossible to use or maintain a lubricating oil film on the dies so very necessary for long die life. At this high temperature, the oxidation rate of normal die materials would also greatly reduce useful die lifetime. Even the rate of successive crimping operations would depend on serious compromises between heat conductance, oxidation rates, compressive strengths and wearing qualities of the material comprising the dies.

In accordance with the present invention, many of the objectionable features of prior art thermo compression and solder bonding are overcome by the application of heat energy at the interface between the metals being joined from a source other than the crimping or pressure applying dies. The heat energy is, instead, supplied by conductance from a surface or portion of the metals flush with or protruding beyond the area under the direct influence of the pressure applying dies. In the cases of both an uninsulated and pre-insulated wire terminal the heat can be applied to the tongue portion of the terminal and/or the wire conductor which appears at or beyond the wire receiving barrel. Even in those cases where no barrel structure is used, such as in joining a wire conductor to a metal tab, the heat energy can be applied to portions of the wire or tab extending beyond the die pressure area. The heat can be applied to the tongue and protruding wire portion of an uninsulated or preinsulated wire terminal in many ways, however, those which have been proven most efficient from various standpoints are: (1) heating by means of an electrical current arc, (2) heating by means of the electrical resistance and heat conductance from one or more electrodes in contact with the work, and (3) heating by means of contacting the work with a pre-heated mass of metal. The thermo compression bonding or solder joining, as can be seen, is therefore accomplished inside an uninsulated or preinsulated terminal during the crimping cycle and simultaneously therewith by applying heat to those portions of the terminal flush with or extending beyond the wire receiving barrel. Further, in accordance with the invention, the heat is applied slightly before or simultaneously with the application of pressure, and more particularly, the peak pressure of the crimping characteristic curve.

It is therefore an object of this invention to provide a method of making an electrical connection whereby the terminal is bonded to the wire by thermo compression bonding or the reflow of solder and the like materials wherein the heat is applied external to the crimping dies and slightly prior to or simultaneously with the crimping action.

It is a further object of this invention to provide a thermo compression bonding or reflow solder process for bonding pre-insulated terminals to wires which will not seriously degrade the wire insulation of the terminal insulation.

It is yet a further object of this invention to provide a thermo compression bonding and reflow soldering process which provides improved electrical and mechanical properties.

The above objects and still further objects of this invention will become apparent to those skilled in the art after consideration of the following preferred embodiment of the invention which is provided by way of example and not by way of limitation wherein:

FIG. 2 is a sectional view of the bonding action taking place for forming the terminal of FIG. 1 with the apparatus therefor;

FIG. 3 is a view in elevation of a second embodiment of the present invention.

Figure 1:
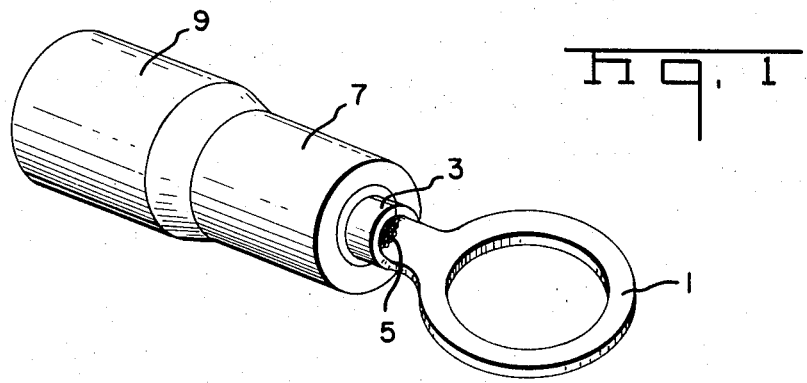
FIG. 1 is a view in elevation of a preinsulated thermo compression diamond gripped terminal as formed in accordance with the present invention.

Referring first to FIG. 1, there is shown a completed terminal formed in accordance with the present invention. The terminal includes a terminal 1 for external connection having an annular portion 3 into which a wire conductor 5 is inserted. Surrounding the wire conductor 5 is a wire insulation composed of a section 7 where crimping action has taken place and a section 9 which is beyond the area where crimping has taken place. The wire 5 and the annular portion 3 of the terminal 1 are bonded by a metal to metal fusion or thermo compression bonding. Such bonding provides improved electrical and mechanical characteristics as compared with an ordinary crimping action as provided by the prior art. Furthermore, the insulation 7 remains intact though crimped because no heat has been applied therethrough as in prior art devices. It should be understood that the method and apparatus described hereinbelow can also be used with uninsulated metal members.

Referring now to FIG. 2, there is shown the apparatus for forming the metal to metal bond in accordance with the present invention. The system includes a barrel crimping die 11 and an insulation crimping die 13 which is offset relative to the die 11 to provide room for the insulation 7 above the wire 5. The dies 11 and 13 are mounted in conventional manner on the ram 12 of a standard crimping press. An annular insulating portion 15 is positioned below the dies and above the insulation support sleeve 17 positioned above the terminal barrel portion 3.

Also set forth is an electrode 19 of an electric arc forming assembly which, for example, can have a 20 to 25 milli-second arc time at the terminal portion of a crimping cycle and provide about 450 amperes of current. This electrode is positioned a slight distance away from the edge of the outwardly extending extension 23 or tongue of the barrel to provide an arc 21 therebetween when power is supplied to the electrode 19 in well known manner. The circuit also includes a power supply 25 which is connected in series with the electrode 19, a switch 27 and a second electrode 29 which is shown to abut the terminal 1. It can be seen that, when the switch 27 is closed, power will be applied to the electrodes 19 and 29 and, in well known manner, a plasma arc can be established between the electrode 19 and the extension or tongue 23 to cause a rapid heating of said tongue and the conductance of heat into those portions of the barrel which are under the influence of the crimping die 11. It can be seen that the heat does not materially penetrate into the insulation since it is supplied for a very short time (on the order of 20 to 25 milliseconds) and in a metal entirely within the insulation. The timing and duration of the heating cycle relative to the application of force by the crimping dies 11 and 13 will depend not only on the rate of heat application but the heat conductivity of the metals being joined. With metals of high conductivity, such as copper, the application of heat can be almost simultaneous with the application of pressure whereas with the lower rate of conductance of the ferrous metals and alloys it would be necessary to begin the heating cycle well in advance of the pressure cycle or else extend the time duration of the application of force in the pressure cycle beyond the time duration of the heating cycle.

Figure 4:
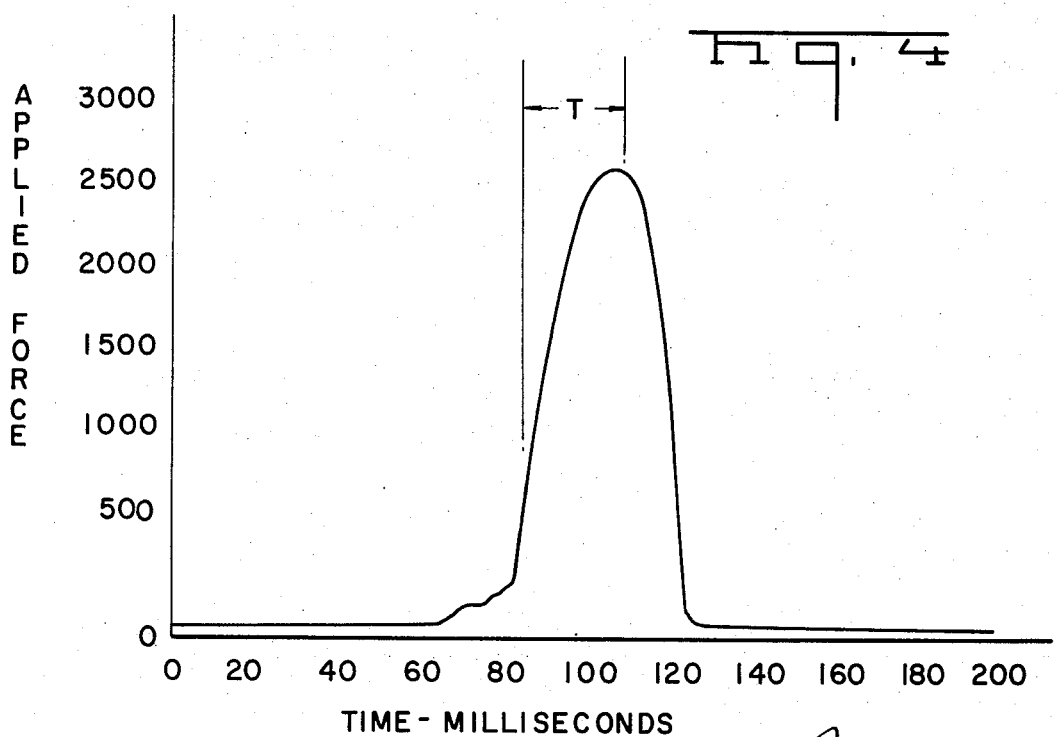
FIG. 4 is a crimping cycle characteristic curve used to illustrate the relative timing of the application of crimping force and heating of the terminal and wire.

As has been said, the heat for fusion should be applied slightly before or simultaneously with the application of pressure to the terminal and wire. The preferred timing relationship is illustrated in FIG. 4 which comprises a typical crimping characteristic curve, i.e., the variation of applied force with time. The timing and duration of the heating cycle (relative to the application of force by dies 11 and 13) is indicated in FIG. 4 by the time interval T, the heating being performed slightly before or at the peak pressure of the crimping characteristic curve.

The initiation of the application of heat, and the timing thereof, may be achieved in any one of a number of ways, as will be clear to those skilled in the art. One suitable method is shown in FIG. 2, wherein the switch 27 comprises a microswitch mounted on and/or rigid with the frame 28 of the crimping press, as by the bracket 30. An actuating cam block 51 is mounted adjustable in position upon the press ram 12 and has a cam surface 53 at the lower end thereof against which a cam follower 55 bears, the cam follower being disposed at the end of a switch operating spring arm 57 on the microswitch 27 as shown. The cam block 51 has slots 59 therein, with mounting bolts 61 extending through such slots and into the ram 12 to hold the cam block rigidly in a preselected position on the ram. It will be clear that cam block 51 is moved downward with ram 12 during crimping, so that cam surface 53 allows operating arm 57 to close microswitch 27 to apply electrical power to electrodes 19 and 29 and establish the plasma arc at a predetermined point in time with respect to the crimping curve of FIG. 4. The slots 59 allow for vertical adjustment of the cam block position and thus for preselection of the time at which the electric arc is established. With the cam block positioned at its uppermost position, the arc for heating is generated simultaneously with application of peak crimping pressure by the dies. Where it is necessary to perform heating slightly prior to reaching peak pressure on the crimping curve, the cam block 51 is moved downward on ram 12 a corresponding distance.

Other suitable ways to operate electrical switch 27 to close the arc forming circuit, not illustrated in the drawing, will be apparent to those skilled in the art. Thus, the dies 11 and 13 could be provided with aligned apertures through which light would pass from a light source onto a photocell when the dies reach a selected position, the photocell output signal being utilized to operate electrical switch 27. Similarly, a pressure sensing arrangement could be employed, wherein a pressure measuring transducer associated with the lower die 11 would produce a switch-operating signal when the desired crimping pressure is reached. In another alternative, the switch 27 may be manually closed by an operator before the start of the crimping operation, with the electrode 19 being a movable electrode positioned to contact the outwardly extending tongue 23 of the barrel when the dies reach the point of peak crimping pressure. In this alternative, the plasma arc forming circuit is of the type more fully disclosed in my prior copending application Ser. No. 433,350, filed Feb. 17, 1965, and now U.S Pat. No. 3,524,963. As explained in the said patent, no arc is struck in this instance when the electrode 19 and the workpiece approach each other; instead, the arc is generated when movable electrode 19 is subsequently moved away from the workpiece defined by the terminal. All that is necessary is for the linkage means of the kind described above to be arranged to move electrode 19 away from its workpiece rather than closing a power circuit via a switch such as switch 27.

By adjusting the amount of force and heat and the relative timing of their application as described above, metal to metal thermo compression and solder type bonds can be achieved. The connection formed by practicing the invention as described herein is highly desirable electrically and mechanically and, due to the manner of heating, provides improved results with pre-insulated structures and economic advantages in the construction of machinery to accomplish these ends with uninsulated terminations.

Also, since the heat is applied only at one end of the wire containing barrel rather than along its entire length as taught by the prior art, the extent of annealing or heat affected metal beyond the barrel can be considerably reduced, thus improving the strength of the finished structure.

Referring now to FIG. 3, there is shown a second embodiment of the present invention. The embodiment includes a pressure die 31 and a pressure anvil 33 for providing a force as indicated by the arrows to force a metal tab 35 and a wire 37 having insulation 39 together. Heat is applied to the metal tab 35 through a heated metal member 41 which is a good heat conductor and forced against the metal tab 35 as indicated by the arrow. The member 43 is forced against the metal tab 35 as indicated by the arrow. The member 43 is a good heat conductor if it is desired to pass heat therethrough. Otherwise it will be a poor heat conductor.

The purpose of the second embodiment is to have the heat assist in bonding the wire conductor 37 to the metal tab 35 at the interface therebetween without having the wire conductor reach a completely annealed state across its complete cross section and particularly at the point at which the pressure die 31 contacts the conductor 37 in the direction of its conducting function. Excessive amounts of annealing are confined to the extreme end of the conductor and not across its complete cross section where it first contacts the tab. In this manner, the wire strength is maintained above the annealed strength thereof and a higher tensile is thus obtained.

Though the invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

I claim:

1. A method of securing a first electrically conductive metal member to a second electrically conductive metal member which comprises the steps of:
   1. positioning the first metal member adjacent to the second metal member with electrically insulating materials surrounding said members,
   2. applying a force to urge the first metal member against the second metal member under pressure exerted throughout a predetermined area of forceful contact between the members, and within said insulating material, and
   3. momentarily heating at least one of the metal members externally of said area of forceful contact to a temperature sufficient to cause an intimate bonding of said first and second metal members at the area of forceful contact simultaneously with said force applying step.

2. A method of securing an electrically conductive metal wire to an electrically conductive metal terminal which is surrounded by electrically insulative material, said method comprising the steps of:
   1. positioning the wire within the insulation clad terminal,
   2. crimping said terminal onto said wire with crimping dies at an area of forceful contact between wire and terminal, and
   3. applying heat momentarily to at least one of said wire and said terminal at a point external of the region of crimping substantially simultaneously with crimping of said terminal to cause fusion of said wire and said terminal at said area of forceful contact during crimping.

3. In an electrical connection system, a first electrically conductive metal member, a second electrically conductive metal member, at least one of said members having an outwardly extending heat conducting portion, means for crimping said first member onto said second member at an area of forceful contact remote from said outwardly extending heat conducting portion, and means remote from said crimping means for momentarily heating said outwardly extending heat conducting portions, so that heating of said metal members is caused solely by heat conducted from said outwardly extending heat conducting portion to said area of forceful contact substantially simultaneous with said crimping to effect fusion therebetween.

4. The electrical connection system as claimed in claim 3, wherein said means for momentarily heating said outwardly extending heat conducting portion comprises means for generating an electric arc at said heat conducting portion.

5. The electrical connection system as claimed in claim 3, wherein said means for localized momentary heating of said outwardly extending heat conducting portion of said conductive metal member comprises means for placing a preheated member in contact with the same.

6. An electrical connection system comprising:
opposed relatively movable crimp members,
first and second electrically conductive metal members positioned between said crimping members,
electrically insulating means interposed between said metal conductive members and said crimping members,
at least one of said conductive metal members including a portion extending beyond said insulating means and said crimping members,
means for moving said crimping members towards each other to effect mechanical crimping of said metal conductive members at an area of forceful contact, and
means for localized momentary heating of said extending portion of said one metal conductive member substantially simultaneously with crimping of said metal conductive members by said crimping members to cause heating and fusion of said metal members to take place at said area of forceful contact.

7. The electrical connection system as claimed in claim 6, wherein said means for localized momentary heating of said extending portion of said one metal conductive member comprises: means for generating an electric arc at said extending portion.

8. The electrical connection system as claimed in claim 7, wherein said opposed relatively movable crimp members comprises relatively movable dies, and said means for generating an electric arc at said outwardly extending heat conductive member, includes electrode means, an electrical power supply operatively connected to said electrode means, and switch means interposed between said power supply means and said electrode means and responsive to movement of said movable die for energizing said electrode means.

9. A system as set forth in claim 7 wherein the circuit loop for said electric arc generating means includes said metal members.

10. The electrical connection system as claimed in claim 6, wherein said opposed relatively movable crimp members comprise relatively movable dies and said means for localized momentary heating of said extending portion of said one metal conductive member comprises: means for generating an electric arc at said outwardly extending heat conductive member, including electrode means, an electrical power supply operatively connected to said electrode means, and switch means interposed between said power supply means and said electrode means and responsive to movement of said movable die for energizing said electrode means.

* * * * *